UNITED STATES PATENT OFFICE.

JOHN ERICKSEN, OF ALBERT LEA, MINNESOTA.

COMPOSITION OF MATTER FOR THE MANUFACTURE OF SOAP.

SPECIFICATION forming part of Letters Patent No. 340,565, dated April 27, 1886.

Application filed January 21, 1886. Serial No. 189,325. (No specimens.)

*To all whom it may concern:*

Be it known that I, JOHN ERICKSEN, a citizen of the United States, residing at Albert Lea, county of Freeborn, and State of Minnesota, have invented certain new and useful Improvements in the Composition of Matter for the Manufacture of Hard Soap, of which the following is a specification.

The said composition consists of the following ingredients, combined and mixed in the manner and proportion herein set forth.

I take and put five and one-half (5½) gallons of water, together with four (4) ounces of medium quality of glue, into a boiler placed over a fire and let it boil, and while so boiling this compound by continuous agitation becomes thoroughly mixed and dissolved. Then I take and put three and one-fourth (3¼) pounds of unslaked lime, together with seven (7) pounds of "sal-soda," previously crushed and reduced to small pieces, into a vessel or stone jar. Take and pour this boiling water so mixed with glue over the unslaked lime and sal-soda, again stirring the composition until thoroughly mixed and dissolved. Then an interval of fifteen minutes' rest is necessary to allow these substances to settle in the vessel or jar. Then I proceed to take twelve (12) pounds of pure tallow or lard, the former ingredient being preferable, cut the same into small pieces, and, thus reduced, put into the boiler, and while boiling stir the same again until thoroughly reduced to a liquid state. Then I strain the liquid substance in the jar, composed of water, glue, unslaked lime, and sal-soda, into the boiler containing the tallow, throwing out the sediment left in the strainer. Then I add one (1) pound of crushed rosin, again stirring the whole thoroughly, after which I add one (1) pint of benzine and four (4) ounces of boiled linseed-oil, then go through the same process of stirring again, over a slow fire, until well mixed and dissolved. At this state of the process I allow the whole mixture to boil for one hour and a quarter, after which the boiler is removed from the fire, and the substance is again thoroughly agitated until it has cooled off. Then I add twelve (12) ounces of powdered borax, stirring and mixing again until all the ingredients are made one solid mass. Then I pour the whole into a tin or any other metal (not wooden) vessel, about the depth of two inches, and allow the same to cool and harden, after which the soap thus produced will be in a condition to be cut into any desirable size or bars, to be placed on a board until dry, ready for use.

Care should be taken to protect the soap from frost until it has gone through a thorough process of drying.

This soap, it is believed, will be equal to the best quality now in the market, and can be manufactured at half the cost required for producing the better grades of soap, consequently can be sold cheaper in the same proportion.

What I claim, and desire to secure by Letters Patent of the United States, is—

The herein-described composition of matter for the manufacture of hard soap, prepared as specified, and consisting of water, glue, unslaked lime, sal-soda, tallow, rosin, benzine, linseed-oil, and borax, in the proportion specified.

In testimony whereof I have hereunto set my hand in the presence of two subscribing witnesses.

JOHN ERICKSEN.

Witnesses:
LOUIS FEESER, Jr.,
HENRY E. RANDALL.